(12) United States Patent
Luciew

(10) Patent No.: US 10,118,546 B2
(45) Date of Patent: Nov. 6, 2018

(54) STOP LAMP AND CARGO LAMP ASSEMBLY

(71) Applicant: Ford Global Technologies, LLC, Dearborn, MI (US)

(72) Inventor: Simon Luciew, Ardeer (AU)

(73) Assignee: Ford Global Technologies, LLC, Dearborn, MI (US)

( * ) Notice: Subject to any disclaimer, the term of this patent is extended or adjusted under 35 U.S.C. 154(b) by 7 days.

(21) Appl. No.: 15/480,816

(22) Filed: Apr. 6, 2017

(65) Prior Publication Data

US 2017/0313244 A1 Nov. 2, 2017

(30) Foreign Application Priority Data

Apr. 29, 2016 (CN) .......................... 2016 1 0282357

(51) Int. Cl.
| | |
|---|---|
| *B60Q 3/62* | (2017.01) |
| *B60Q 1/44* | (2006.01) |
| *B60Q 3/30* | (2017.01) |
| *B60Q 1/26* | (2006.01) |
| *B60Q 3/50* | (2017.01) |
| *B60Q 3/82* | (2017.01) |

(52) U.S. Cl.
CPC ............ *B60Q 3/62* (2017.02); *B60Q 1/2696* (2013.01); *B60Q 1/44* (2013.01); *B60Q 3/30* (2017.02); *B60Q 3/50* (2017.02); *B60Q 3/82* (2017.02)

(58) Field of Classification Search
CPC . B60Q 3/062; B60Q 3/30; B60Q 3/62; B60Q 1/2696; B60Q 1/44; B60Q 3/50
See application file for complete search history.

(56) References Cited

U.S. PATENT DOCUMENTS

| | | | |
|---|---|---|---|
| 6,086,230 A | 7/2000 | Wooldridge et al. | |
| 6,416,106 B2 | 7/2002 | Ponziani | |
| 6,976,774 B2 | 12/2005 | Reiss | |
| 8,047,691 B2 | 11/2011 | Leese et al. | |
| 9,403,476 B2* | 8/2016 | Hausler | B60Q 1/0041 |
| 2004/0130902 A1* | 7/2004 | Snyder | B60Q 3/30 362/485 |
| 2014/0198510 A1* | 7/2014 | Law | B60Q 3/35 362/485 |
| 2015/0336503 A1 | 11/2015 | Hausler et al. | |

FOREIGN PATENT DOCUMENTS

DE 202015102226 8/2015

* cited by examiner

*Primary Examiner* — Robert J May

(74) *Attorney, Agent, or Firm* — Frank Mackenzie; Mohr IP Law Solutions, PC

(57) ABSTRACT

A stop lamp and cargo lamp system comprises a circuit board; a stop lamp mounted on the circuit board; a first cargo lamp assembly including a first cargo lamp mounted on the circuit board and a first directional tube coupled to the first cargo lamp and formed a first downward angle with a surface of the circuit board; and a second cargo lamp assembly including a second cargo lamp mounted on the circuit board and a second directional tube coupled to the second cargo lamp and form a second downward angle with the surface of the circuit board, wherein the second downward angle is different from the first downward angle.

19 Claims, 9 Drawing Sheets

US 10,118,546 B2

STOP LAMP AND CARGO LAMP ASSEMBLY

RELATED APPLICATION

This application claims the benefit of Chinese Patent Application No.: CN 201610282357.2 filed on Apr. 29, 2016, the entire contents thereof being incorporated herein by reference.

FIELD

The present disclosure relates to a stop lamp and cargo lamp assembly in a vehicle, in particular, relates to an integrated stop lamp and cargo lamp assembly having cargo lamps with directional tubes.

BACKGROUND OF THE INVENTION

A vehicle such as a pickup truck includes a stop lamp and cargo lamps mounting on an exterior of a cab, or mounted to spoiler attached to rear of the cab, or mounted to sports hoop attached to a load box. The lights from the cargo lamps are directed to a cargo bed of the truck to provide illumination in the dark. However, the lights may not be projected to the desired cargo areas due to limited options for the layout of the cargo lamp relative to the cargo bed. It is especially challenging for the cargo lamp design in the countries where the homologation requires the light from a cargo lamp to be projected downward so that it does not interfere the line of sight of an approaching vehicle from the rear.

SUMMARY

According to one aspect of the present disclosure, a stop lamp and cargo lamp system is provided. The stop lamp and cargo amp system may comprise a circuit board; a stop lamp mounted on the circuit board; a first cargo lamp assembly including a first cargo lamp mounted on the circuit board and a first directional tube coupled to the first cargo lamp and formed a first downward angle with a surface of the circuit board and a second cargo lamp assembly including a second cargo lamp mounted on the circuit board and a second directional tube coupled to the second cargo lamp and form a second downward angle with the surface of the circuit board. The first directional tube may be configured to direct light from the first cargo lamp downward to form a first light path. The second directional tube may be configured to direct light downward to form a second light path different from the first light path.

In one embodiment, the first cargo lamp assembly may further include a first lens disposed on the first directional tube, and the second cargo lamp assembly may further include a second lens disposed on the second directional tube.

In another embodiment, the stop lamp may be mounted on the surface of the circuit board or the stop lamp may be mounted on a surface opposite to the surface that the first cargo lamp and the second cargo lamp is mounted.

In another embodiment, the light from the stop lamp may form a third light path at a rearward direction different from the first light path and the second light path.

In another embodiment, the stop lamp and cargo lamp system may further comprise a housing enclosing the circuit board, the stop lamp, the first and second cargo lamp assemblies. The surface of the circuit board may face rearward and may be substantially perpendicular to a top surface of the housing.

In another embodiment, the stop lamp and cargo lamp system may further comprise a housing enclosing the circuit board, the stop lamp, the first and second cargo lamp assemblies. The surface of the circuit board may face downward and may be substantially parallel to a top surface of the housing.

In another embodiment, the first cargo lamp, the second cargo lamp and the stop lamp may be LEDs.

In another embodiment, the lights from the first cargo lamp assembly and the second cargo lamp assembly may be projected more downward than light from the stop lamp such that the lights from the first and second cargo lamps do not interfere with line of sight of approaching vehicle from rear.

In another embodiment, the first directional tube and second direction tube may be formed from a tube having the same diameter or formed from a tube having varied diameters.

In another embodiment, the first directional tube and the second directional tube may be made from material that is opaque to light and the first directional tube may be coupled to the first cargo lamp by attaching a base end of the first directional tube to the circuit board and the second directional tube may be coupled to the second directional tube by attaching a base end of the second directional tube to the circuit board.

In another embodiment, the first cargo lamp and the second cargo lamp may be turned on or off by a user via a switch or the first cargo lamp and the second cargo lamp may be connected an interior light system, and the first cargo lamp and the second cargo lamp turn on when an interior light is on.

In another embodiment, the first directional tube and the second direction tube may be snapped to the first cargo lamp and the second cargo lamp, respectively.

In another embodiment, the stop lamp and cargo lamp system may further comprise a housing and a third cargo lamp assembly. The first, second and third cargo lamp assemblies may be disposed along a length of the housing sequentially. The third cargo lamp assembly may include a third cargo lamp mounted on the surface of the circuit board and a third directional tube coupled to the third cargo lamp and formed a third downward angle that is substantially the same as the first downward angle.

In another embodiment, the stop lamp and cargo lamp system may further comprise a housing, a third cargo lamp assembly, a fourth cargo lamp assembly, a fifth cargo lamp assembly, and a sixth cargo lamp assembly. The first, second, third, fourth, the fifth, and the sixth cargo lamp assemblies may be disposed along a length of the housing sequentially. The third cargo lamp assembly may include a third cargo lamp mounted on the circuit board and a third directional tube coupled to the third cargo lamp and formed to a third downward angle that is different from the first downward angle and the second downward angle. The fourth cargo lamp assembly may include a fourth cargo lamp mounted on the circuit board and a fourth directional tube coupled to the fourth cargo lamp and formed a fourth downward angle that is substantially the same as the third downward angle. The fifth cargo lamp assembly may include a fifth cargo lamp mounted on the circuit board and a fifth directional tube coupled to the fifth cargo lamp and formed a fifth downward angle that is substantially the same as the second downward angle. The sixth cargo lamp assembly may include a sixth cargo lamp mounted on the circuit board and a sixth directional tube coupled to the sixth cargo lamp and formed a sixth downward angle that is substantially the same as the first downward angle.

According to another aspect, a stop lamp and cargo lamp system in a vehicle is provided. The stop lamp and cargo lamp system may comprise a circuit board; a plurality of stop lamps on the circuit board; a first cargo lamp mounted on the circuit board and a first directional tube coupled to the first cargo lamp and configured to direct light from the first cargo lamp downward and rearward to a first cargo area of the vehicle; a second cargo lamp mounted on the circuit board and a second directional tube coupled to the second cargo lamp and is configured to direct light from the second cargo lamp downward and rearward to a second cargo area of the vehicle. The first cargo area may be different from the second cargo area.

In one embodiment, the stop lamp and cargo lamp system may further comprise a first lens disposed in the first directional tube and a second lens disposed in the second directional tube. The first lens may be disposed to be spaced away from the first cargo lamp and mounted on a recess at a distal end of the first directional tube, and the second lens may be disposed to be spaced away from the second cargo lamp and mounted on a recess at a distal end of the second directional tube.

In another embodiment, the lights from the first cargo lamp and the second cargo lamp may be directed downward so as not to interfere with line of sight of approaching vehicle from rear.

According to another aspect, a truck may comprise a cab; a cargo bed; and a stop lamp and cargo lamp system. The stop lamp and cargo lamp system may include a housing mounted on an exterior top area of the cab, a circuit board disposed in the housing, a stop lamp mounted on the circuit board, and a plurality of cargo lamp assemblies, wherein each of the cargo lamp assembly is configure to direct a light to a predetermined cargo area in the cargo bed. Light beams from the plurality of cargo lamp assembly collectively may cover a main area of a cargo bed of the truck.

In one embodiment, each cargo lamp assembly may include a directional tube to direct the light to the predetermined area.

In another embodiment, each cargo lamp assembly further includes a lens, wherein the light from each cargo lamp are directed downward so that it does not interfere with line of sight of an approaching vehicle from a rear.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar identical reference numbers in the various drawings is intended to indicate the presence of a similar or identical element or feature.

DETAILED DESCRIPTION

Example embodiments of the present disclosure will now be described more fully with reference to the accompanying drawings, in which example embodiments are shown. Example embodiments of the present disclosure may, however, be embodied in many different forms and should not be construed as being limited to the embodiments set forth herein; rather, these embodiments are provided so that this disclosure will be thorough and complete, and will fully convey the concept of example embodiments to those of ordinary skill in the art.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including,"

if used herein, specify the presence of stated features, integers, steps, operations, elements and/or components, but do not preclude the presence or addition of one or more other features, integers, steps, operations, elements, components and/or groups thereof.

Figure 1:
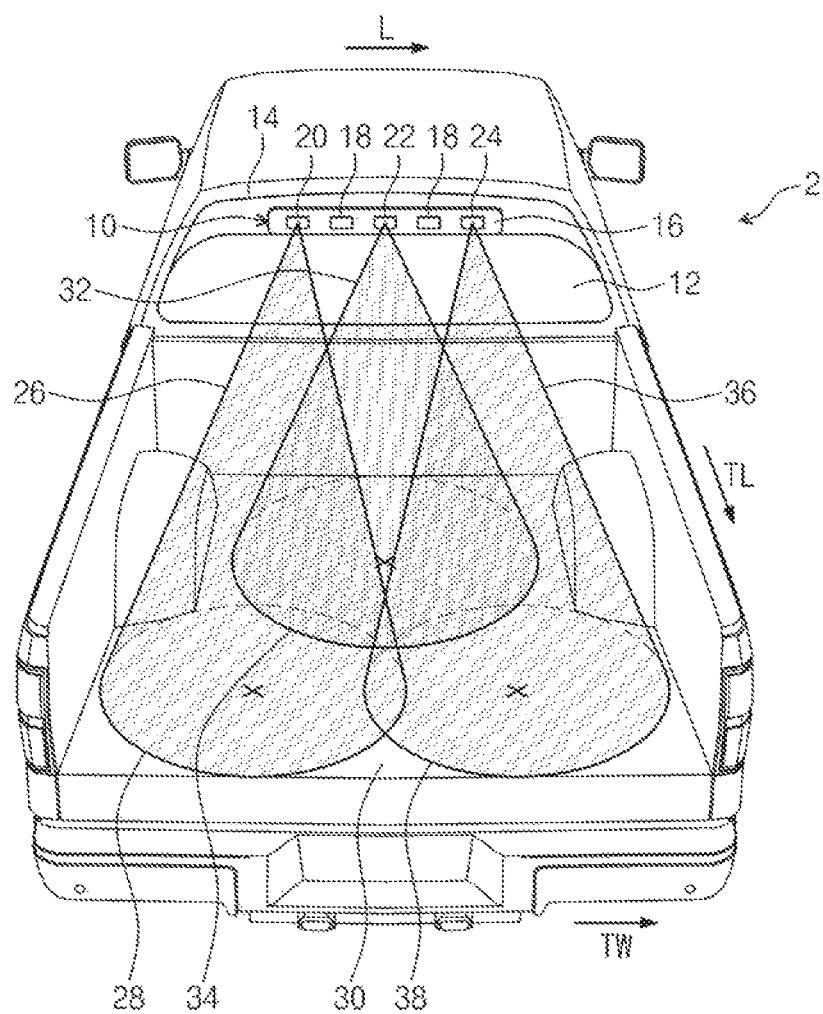
FIG. 1 is a perspective view of a truck, showing light paths from cargo lamp assembly of one example embodiment of a stop lamp and cargo lamp system of the present disclosure.

FIG. 1 is a perspective view of a truck 2, showing a stop lamp and cargo lamp system 10 and light paths from cargo lamps according to one example embodiment of the present disclosure. The stop lamp and cargo lamp system 10 may be mounted above a rear window 12 of a cab 14. The stop lamp and cargo lamp system 10 may include a housing 16, a stop lamp 18 and a first, second and third cargo lamp assemblies 20, 22 and 24. The stop lamp 18 may include an incandescent lamp or a plurality of LEDs and may be electrically connected to a braking system of the truck 2. When a driver presses the brake, the stop lamp 18 is turned on and projects light in a rearward direction.

The first, second and third cargo lamp assemblies 20, 22 and 24 may provide illumination light to a cargo bed in the truck 2. In some embodiments, the cargo lamps of the first, second and third cargo lamp assemblies 20, 22 and 24 may be turned on by the user. In some embodiments, the cargo lamps of the first, second and third cargo lamp assemblies 20, 22 and 24 may be electrically connected to an interior light system in the truck 2 and may be turned on when the interior light is turned on. The first cargo lamp assembly 20 may project light with a light path 26 and the light may be projected in a light beam pattern 28 on a cargo bed 30. The second cargo lamp assembly 22 may project light with a light path 32 and the light may be projected in a light beam pattern 34. The third cargo lamp assembly 24 may project light with a light path 36 and the light ay be projected in a light beam pattern 38. The beam patterns 28, 34 and 38 may substantially cover a main area of the cargo bed 30. FIG. 1 also shows a width direction TW and a length direction TL of the truck 2.

FIG. 1 shows only an example embodiment where the stop lamp and cargo lamp system may be mounted. It should be appreciated that the stop lamp and cargo lamp system may be mounted to a different location depending on the vehicle styling. For example, the stop lamp and cargo system may be mounted to spoiler attached to rear of cab or mounted to sports hoop attached to a load box structure.

Figure 2A:
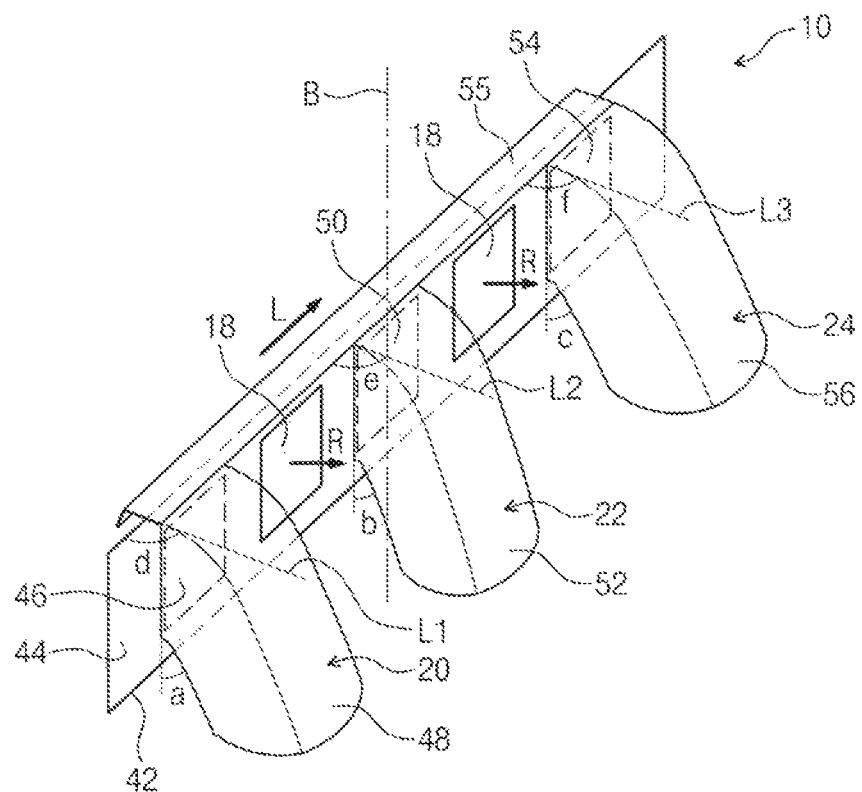
FIG. 2A is a perspective view of the stop lamp and cargo lamp assembly of FIG. 1.

FIG. 2A is a perspective view of the stop lamp and cargo lamp system 10 in FIG. 1, schematically illustrating a first cargo lamp assembly 20, a second cargo lamp assembly 22 and a third cargo lamp assembly 24 mounted on a circuit board 42. Referring FIG. 2A and further referring to FIG. 1, the stop lamp and cargo lamp system 10 may include a plurality of stop lamps 18 such as LEDs. In the depicted embodiment, there are two stop lamps 18. The lights from the stop lamps 18 may pass through a red diffusor on the housing 16 in a rearward direction R. It should be appreciated that any number of the stop lamps are possible depending on the vehicle styling. For example, the number of the stop lamps 18 may be ranged from 2 to 12 in a stop lamp and cargo lamp system.

In sonic embodiments, the first, second, and third cargo lamp assemblies 20, 22 and 24 may be mounted on a circuit board 42 along a length direction L of the housing 16 or the width direction TW of the truck (see FIG. 1). In the depicted embodiment, the circuit board 42 is disposed on a surface 44 facing rearward or disposed substantially perpendicular to a top surface of the housing 16. In other words, the surface 44 of the circuit board 42 is substantially perpendicular to the cargo bed 30. The first cargo lamp assembly may include a first cargo lamp 46 and a first directional tube 48, the second cargo lamp assembly 22 may include a second cargo lamp 50 and a second directional tube 52 and the third cargo lamp assembly 24 may include a third cargo lamp 54 and a third directional tube 56. The first, second and third cargo lamps 46, 50 and 54 may be LEDs.

The stop lamp 18, the first, second and third cargo lamps 46, 50 and 54 may be mounted on the surface 44 of the circuit board 42. It should be appreciated that the circuit board may be disposed in various positions in relation to the cargo bed or the top surface of the housing of the stop lamp and cargo lamp system. For example, the circuit board may form an angle with the top surface of the housing. The stop lamp and the cargo lamps may be disposed on the same surface or different surfaces of the circuit board 42.

The first directional tube 48 may form a first downward angle "a" with the surface 44 of the circuit board 42. The second directional tube 50 and the surface 44 may form a second downward angle "b" different from the first downward angle "a". In the depicted embodiment, the first downward angle "a" is greater than the second downward angle "b" so that the light from the first cargo lamp assembly 20 is projected more rearward than the light from the second cargo lamp assembly 22 (see FIG. 1). The third directional tube 56 and the surface 44 may form a third downward angle "c". In the depicted embodiment, the third downward angle "c" is the same as the second downward angel "a" so that the lights from the first cargo lamp assembly 20 and the third cargo lamp assembly 24 are projected approximately the same distance in a length direction TL of the truck 2 (see FIG. 1). It should be appreciated that the third downward angle "c" may be different from the first downward angle "a".

FIG. 2A further shows that the first directional tube 48 may form a first lateral angle "d" with a line L1 substantially perpendicular to the surface 44 of the circuit board 42. The second directional tube 52 may form a second lateral angle "e" with a line L2 substantially perpendicular to the surface 44 of the circuit board 42. The third directional tube 56 may form a third lateral angle "f" with a line L3 substantially perpendicular to the surface 44 of the circuit board 42. The first, second, and third lateral angles, "d", "e" and "f" may be different. In the depicted embodiment, the first and third lateral angles, "d" and "f" are substantially the same but symmetrically opposite; and the second lateral angle "e" is substantially 90 degrees. In some embodiments, the second directional tube 52 may be disposed substantially at a central portion of the circuit board 42, i.e., a central line B may bisect an area of the second directional tube 52 on the circuit board 42.

The first, second and third directional tubes 48, 52 and 56 may be made of plastic material that is not transparent or opaque to the light. For example, the directional tubes may be made from polypropylene or black polypropylene (PP). Thus, each cargo lamp assembly may have its individual light path, and may be separated from the stop lamp 18 and other cargo lamp assemblies. In some embodiments, an inside surface of the directional tube may be formed with a parabolic profile to reflect more light. In some embodiments, the inside surface may be coated with reflective coating (i.e., silver or whitecolor coating) via painting or co-molding process.

As shown in FIG. 2A, an end portion of the first, second and third directional tubes may be connected to a case 55, respectively. In the depicted embodiment, the case 55 is disposed on an edge portion of the circuit board 42, and the case 55 and the first, second and third directional tubes are formed as an integral part. A single piece configuration of the case and the directional tubes saves cost and is easy to be assembled. It should be appreciated that various variations on the configuration of the circuit board and the lamp assemblies are possible. For example, a recess may be formed along a length of the circuit board and the integrated case and cargo lamp assemblies may be disposed in the recess. In this manner, the cargo lamp assemblies occupied less space.

Figure 2B:
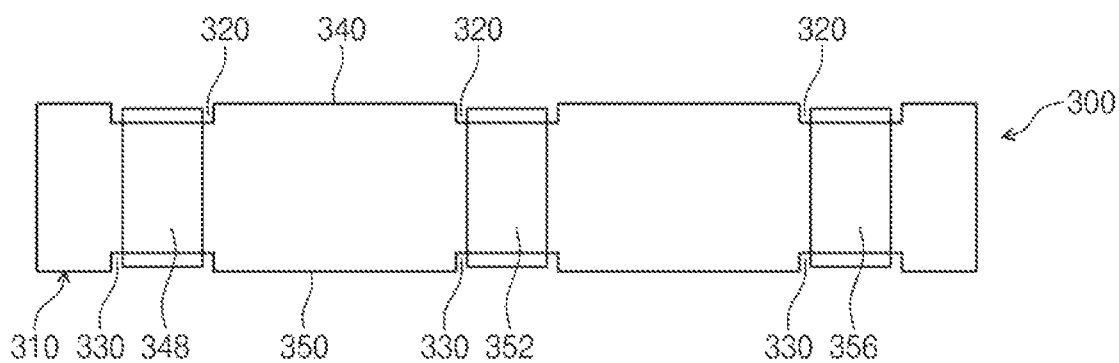
FIG. 2B is a plan view of the stop lamp and cargo lamp assembly according to another embodiment of the present disclosure.

FIG. 2B is a plan view of a stop lamp and cargo lamp assembly 300 according to another embodiment of the present disclosure. In the depicted embodiment, a first directional tube 348, a second directional tube 352 and a third directional tube 356 are individually mounted to a circuit board 310. The circuit board 310 may have a plurality of upper recess 320 at an upper portion 340 and a plurality of lower recess 330 at a lower portion 350. An upper end and a lower end of the first directional tube 348 may be secured at the upper recess 320 and the lower recess 330, respectively. Similarly, an upper end and a lower end of the second directional tube 352 and an upper end and a lower end of the third directional tube 356 may be secured into the corresponding upper recess 320 and lower recess 330 of the circuit board 310, respectively. The individually mounted directional tube can provide flexibility in design and can be adapted to a housing that has limited space to receive the cargo lamp assembly.

It should be appreciated that the circuit board may only have upper recesses at the upper portion, and an upper end of each directional tube may be mounted into a corresponding upper recess.

Figure 3A:
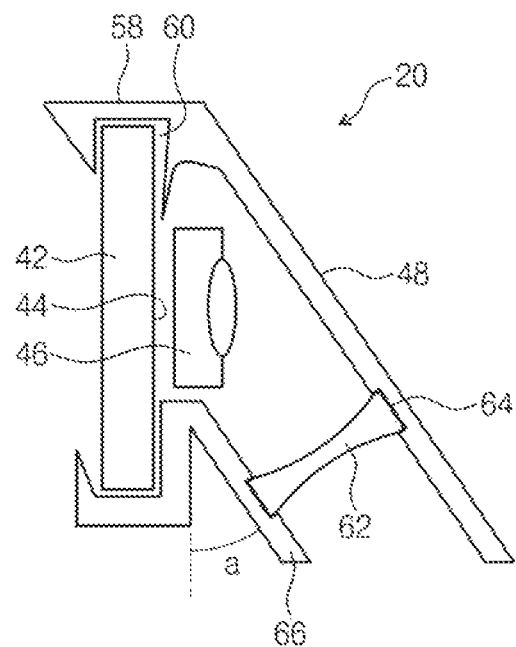
FIG. 3A is a side cross-sectional view of the first cargo lamp assembly of the stop lamp and cargo lamp system of FIG. 1.

FIG. 3A is a side cross-sectional view of the first cargo lamp assembly 20. The first directional tube 48 may be configured to form the angle "a" with a surface substantially parallel the surface 44 of the circuit board 42. In some embodiments, the first directional tube 48 may be coupled to the first cargo lamp 46 and to enclose the first cargo lamp 46. In the depicted embodiment, a base end 58 of the first directional tube 48 may include a recess 60 so that the first directional tube 48 may be clipped over the circuit board 42. In some embodiments, the base end 58 and the recess 60 may be part of the case 55 that may be a common case to other directional tubes as well (referring to FIG. 2A). In some embodiments, the base end 58 and the recess 60 may form an individual case. It should be appreciated that the directional tube may be coupled to the cargo lamp by any suitable method. For example, the directional tube may be attached to the circuit board via through pins, heat staking or adhesive bonding so that the cargo lamp may be received at a location adjacent to the base end of the directional tube. In another example, the directional tube may be snapped into the cargo lamp. In yet another example, the directional tube may be part of housing and soldered in place as surface mount or through hole assembly. In still another example, a cargo lamp such as an LED may be integrated into the directional tube and then the LED and the directional tube are mounted to the circuit board as an integral part.

In some embodiments, the first directional tube 48 may have a tubing like shape with the substantially same diameter along its length. However, it should be appreciated that the directional tube 48 may be of any configuration to direct the light to a targeted area of the cargo bed. In some embodiments, the diameter of the directional tube may vary along its length. For example, the directional tube may include a conical shaped portion. In the conical shaped portion, the diameter of the directional tube may increase in a direction away from the base end of the directional tube.

The first cargo lamp assembly 20 may further include a first lens 62 to change the light path so that the light may be projected to a targeted cargo area. The first lens 62 may be disposed in the first directional tube 48. In some embodiments, the first lens 62 may be disposed to be spaced away from the first cargo lamp 46 and may be disposed on a recess 64 adjacent to a distal end 66 of the first directional tube 48. In some embodiments, the first lens 62 may be a negative or diverging lens such as biconcave or plan-concave lens and the beam passing through the first lens 64 may be diverged or spread. In some embodiments, the first lens 62 may be a positive or converging lens such as biconvex or plano-convex and the beam passing through the lens 62 may be converged to a spot. The first lens 62 may change the light path or the size of the beam pattern projected on a cargo bed of the vehicle. It should be appreciated that any suitable lenses may be used to diverge or converge the light from the cargo lamp so that the light projected to the cargo bed covers a target cargo area.

Figure 3B:
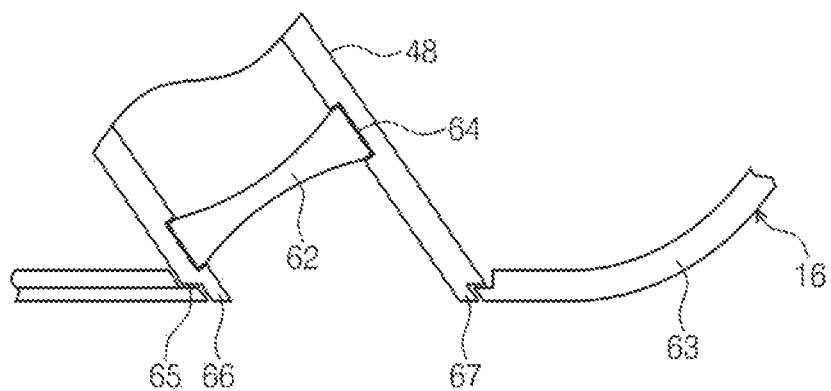
FIG. 3B is a partial side cross-sectional view of the first cargo lamp assembly of the stop lamp and cargo lamp system of FIG. 1, illustrating mounting of the directional tube on a housing of the stop lamp and cargo lamp system.

FIG. 3B is a partial side cross-sectional view of the first cargo lamp assembly of the stop lamp and cargo lamp system of FIG. 1, illustrating mounting of the directional tube on a housing of the stop lamp and cargo lamp system 10. As shown in FIG. 3B, the first directional tube 48 may include a protrusion 67 at the distal end 66. A wall 63 of the housing 16 of the stop lamp and cargo lamp system 10 may include a recess or a hole 65. The hole 65 may have a stepped configuration. The first direction tube 48 may be slid across a channel on a surface of an inner wall of the housing and positioned above the hole 65, and then snapped into the place. In the depicted embodiment, the lens 62 may be fixed into the directional tube 48 before it is assembled to the housing 16. As the directional tube 48 is exposed to the outside environment via the hole 65, the lens 62 has additional function of keeping insects from entering into the directional tube 48.

Figure 4:
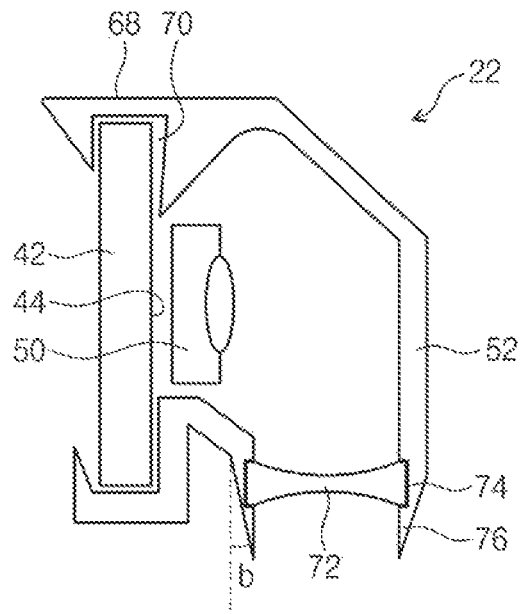
FIG. 4 is a side cross-sectional view of the second cargo lamp assembly of the stop lamp and cargo lamp system of FIG. 1.

FIG. 4 is a side cross-sectional view of the second cargo lamp assembly 22. For the sake of brevity, in this example, the elements and features similar to those previously shown and described will not be described in much further detail. The second directional tube 52 may be coupled to the second cargo lamp 50 and configured to enclose the second cargo lamp 50. The second directional tube 52 may form the angle h with a surface substantially parallel the surface 44 of the circuit board 42. In some embodiments, a base end 68 of the second directional tube 48 may include a recess 70 so that the second directional tube 52 may be clipped onto the circuit board 42. In some embodiments, the base end 68 and the recess 70 may be part of the case 55 that may be a common case to other directional tubes as well (referring to FIG. 2A). In some embodiments, the base end 68 and the recess 70 may form an individual case.

In some embodiments, the second cargo lamp assembly 22 may further include a second lens 72 to change the light path so that the light may be projected to a desired cargo area of the cargo bed. The second lens 72 may be disposed in the second directional tube 52. In some embodiments, the second lens 72 may be disposed to be spaced away from the second cargo lamp 50 and may be disposed on a recess 74 at a distal end 76 of the second directional tube 50. In some embodiments, the second lens 72 may be the same as the first lens 62 so that the sizes of light beam patterns projected on the cargo bed are substantially the same. In some embodiments, the second lens 72 may be different from the first lens 62 so that the sizes of light beam patterns projected on the cargo bed are different.

In some embodiments, a distal portion of the second directional tube 52 may be assembled to the housing 16 in a manner similar to that described in FIG. 3B. That is, the second directional tube 52 may include a protrusion to be snap-fitting into a recess on the housing 16.

The third cargo lamp assembly 24 may have similar structure to the first cargo lamp 22 and may be mounted on to the circuit board 42 in a similar matter. Further, the third cargo lamp assembly 24 may include a third lens (not show).

Figure 5:
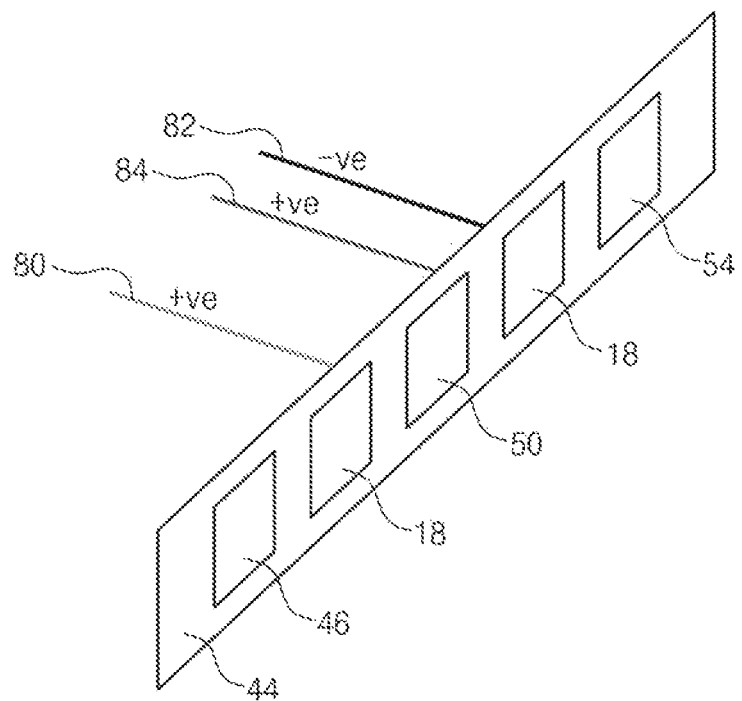
FIG. 5 is a perspective view of a circuit board of the stop lamp and cargo lamp system in FIG. 1.

FIG. 5 is a perspective view of the circuit board 42 of the stop lamp and cargo lamp system 10. The stop lamps 18, and the first, second and third cargo lamps 46, 50 and 54 may be mounted on the surface 44 of the circuit board 42. Three wires may be connected the circuit board 42 to provide power to the stop and cargo lamps. A wire 80, a wire 82 and a circuit of the cargo lamps may be electrically connected to provide a current to the cargo lamps 46, 50 and 54. A wire 84, the wire 82 and a circuit of the stop lamps 18 may be electrically connected to provide a current to the stop lamps 18. The wire 82 has lower electrical potential and may be used as a common wire for the stop lamp and cargo lamp circuits.

The stop lamp and cargo lamp system 10 of the present disclosure has various advantages. For example, the lights from the cargo lamps can be directed to target areas of the cargo bed and collectively provide sufficient illumination to the cargo bed of the truck. As the light beams are directed downward so that they do not interfere the line of sight of an approaching vehicle in the rear. Thus, the homologation requirement on the cargo lamps in some countries can be met while providing illumination to the user's satisfaction. Further, the integrated feature of the circuit board and wires for the stop lamp and cargo lamps makes the system simple and achieve cost savings.

Figure 6:
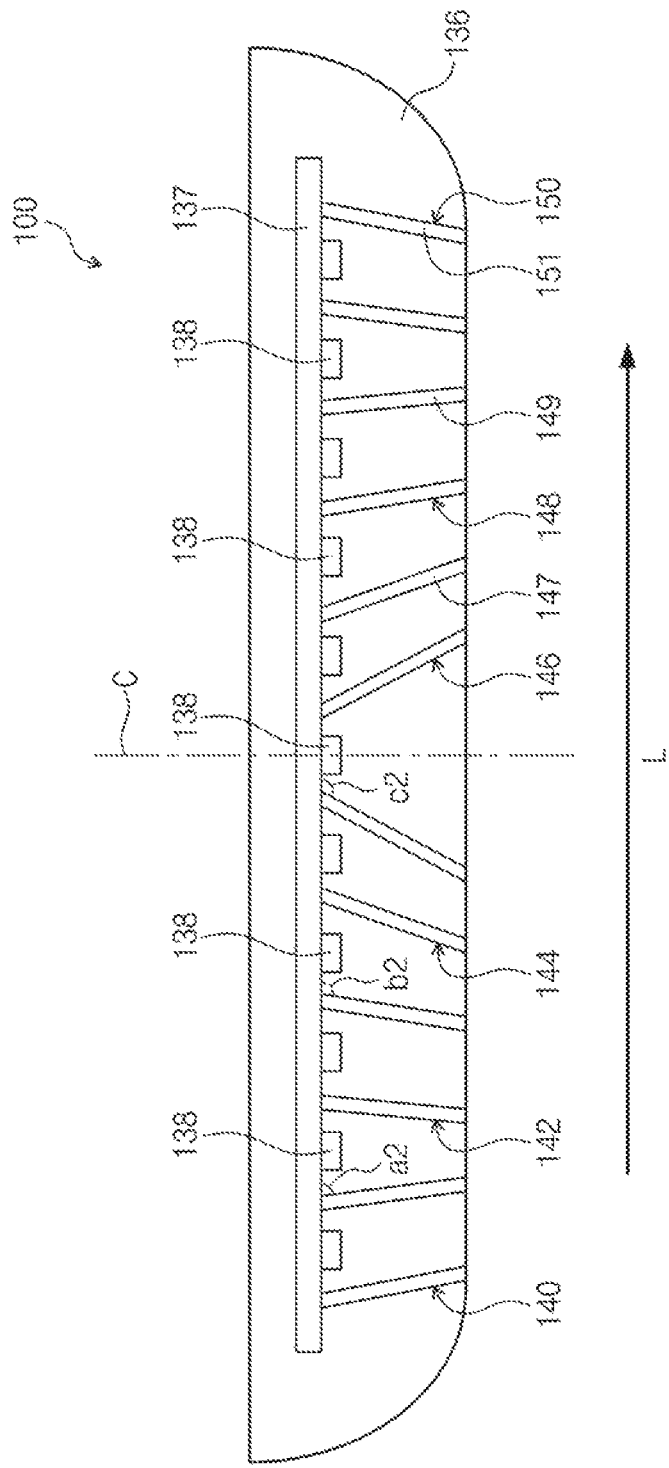
FIG. 6 is a plan cross-sectional view of another example embodiment of a stop lamp and cargo lamp system of the present disclosure.

FIG. 6 is a plan view of another example embodiment of a stop lamp and cargo lamp system 100 of the present disclosure. The stop lamp and cargo lamp assembly 100 may include a housing 136, a plurality of stop lamps 138 and a plurality of cargo lamp assemblies 140, 142, 144, 146, 148 and 150, each mounted on a circuit board 137.

Figure 7:
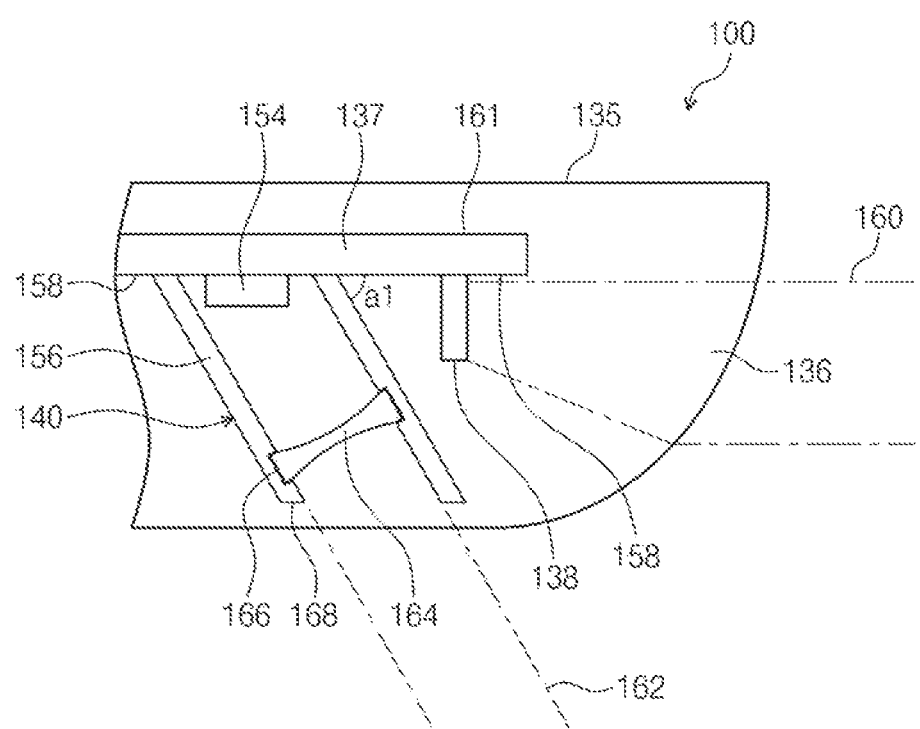
FIG. 7 is a cross-sectional view of the stop lamp and cargo lamp system in FIG. 6, illustrating a first cargo lamp assembly of the stop lamp and cargo lamp system.

FIG. 7 is a cross-sectional view of the stop lamp and cargo lamp system 100 in FIG. 6, illustrating the first cargo lamp assembly 140 and associated components. The stop lamp 138 and the first cargo lamp assembly 140 may be mounted on a circuit board 137. In the depicted embodiment, a main surface of the circuit board 137 is disposed horizontally or is substantially parallel to a top surface 135 of the housing 136. In other words, the main surface of the circuit board 137 is disposed substantially parallel a cargo bed of a vehicle. It should be appreciated that the circuit board 137 may be disposed in any suitable position. For example, the circuit board 52 may be disposed vertically as illustrated in FIGS. 1-5 or may be disposed in an angle relative to the cargo bed.

The stop lamp 138 and the first cargo lamp assembly 140 may be mounted on a same surface of the circuit board 137. In the depicted embodiment, both stop lamp 138 and the first cargo lamp assembly 140 are mounted on a bottom surface 158 of the circuit board 137. In some embodiments, the stop lamp 138 and the cargo lamp assembly may be mounted on a different surfaces of the circuit board 137. For example, the stop lamp 138 may be disposed on a top surface 161 of the circuit board 137 while the first cargo lamp assembly 140 may be disposed on the bottom surface 158 of the circuit board 137.

The first cargo lamp assembly 140 may include a first cargo lamp 154 and a first directional tube 156. The first cargo lamp may include a LED. The first directional tube 156 may form a downward angle "a1" with a surface of the circuit board 137. In the depicted embodiment, the downward angle "a1" is an angle between the directional gibe 156 and the bottom surface 158 or the top surface 161 of the circuit board 137. Referring back to FIG. 6, in some embodiments, the first directional tube 156 may form a lateral angle "a2" with a line at a length direction L of the stop lamp and cargo lamp system 100.

The first directional tube 156 may be made of plastic material that is not transparent or opaque to the light, such as, Polypropylene. Thus, the first cargo lamp assembly 140 may have its own light path separated from the stop lamp 138 and other cargo lamp assemblies. As shown in FIG. 7, the light from the stop lamp 138 may be diffused in the housing 136 and then is projected downward and rearward in a light beam or a light path 160 from the stop lamp 138. Whereas, the light from the first cargo lamp 140 is guided by the first directional tube 156 and projected in a light path 162. The light path 162 of the first cargo lamp assembly 140 may be rearward but further downward compared to the light path 160 of the stop lamp 138.

The first directional tube 156 may be mounted to the circuit board 137 in any suitable method as described above. In the depicted embodiment, the first directional tube 156 may have a tubing like shape with the substantially same diameter along its length. However, it should be appreciated that the directional tube may be of any configuration to direct the light to a desired areas of the cargo bed.

The first cargo lamp assembly 140 may further include a first lens 164 to change the light path 162 so that the light is projected to a desired cargo area. The first lens 164 may be disposed in the directional tube 156. In some embodiments, the first lens 164 may be disposed to be spaced away from the first cargo lamp 154 and may be disposed on a recess 166 at a distal end 168 of the first directional tube 156. The first lens 164 may be any suitable lens as described above.

Figure 8:
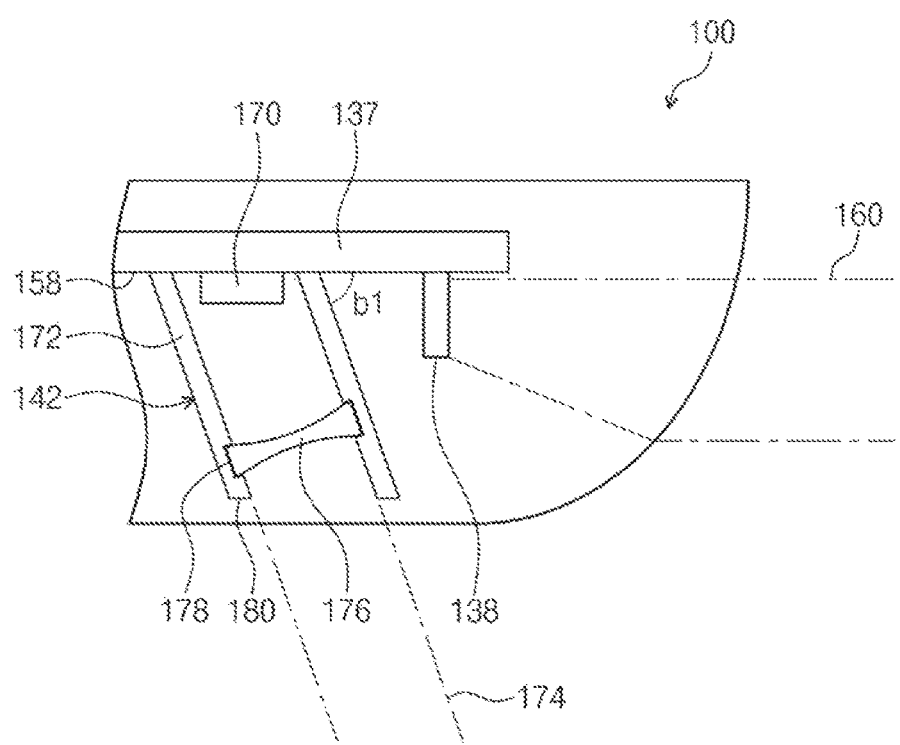
FIG. 8 is a cross-sectional top view of the stop lamp and cargo lamp system in FIG. 6, illustrating a second cargo lamp assembly of the stop lamp and cargo lamp system.

FIG. 8 is a cross-sectional top view of the stop lamp and cargo lamp system 100 in FIG. 6, schematically illustrating the second cargo lamp assembly 142 and associated components. For the sake of brevity, in this example, the elements and features similar to those previously shown and described will not be described in much further detail. The second cargo lamp assembly 142 may include a second cargo lamp 170 and a second directional tube 172. The second cargo lamp 170 may include a LED. The second directional tube 172 may form a downward angle "b1" with a surface of the circuit board 137. The downward angle "b1" may be different from the downward angle "a1" between the first directional tube 156 and the circuit board 137. In this manner, the light from the second cargo lamp assembly 142 may be directed downward to a different degree than the light from the first cargo lamp assembly 140. Referring back to FIG. 6, in some embodiments, the second directional tube 172 may form a lateral angle "b2" with a line at a length direction L of the stop lamp and cargo lamp system 100. The lateral angle "b2" may be different from the lateral angle "a2" of the first directional tube 1.56. In this manner, the light from the second cargo lamp assembly 142 may be directed a different degree at the length direction L than the light from the first cargo lamp assembly 140. The light passing through the second cargo lamp assembly 142 may form a light path 174 that may be different from the light path 162 generated by the first cargo lamp assembly 140. The light path 174 of the second cargo lamp assembly 142 may be rearward but further downward compared to the light path 160 of the stop lamp 138 and the light path 162 of the first cargo lamp assembly 140.

In some embodiments, the second cargo lamp assembly 142 may further include a second lens 176. In some embodiments, the second lens 176 may be disposed to be spaced away from the second cargo lamp 170 and may be disposed on a recess 178 at a distal end 150 of the second directional tube 172.

Figure 9:
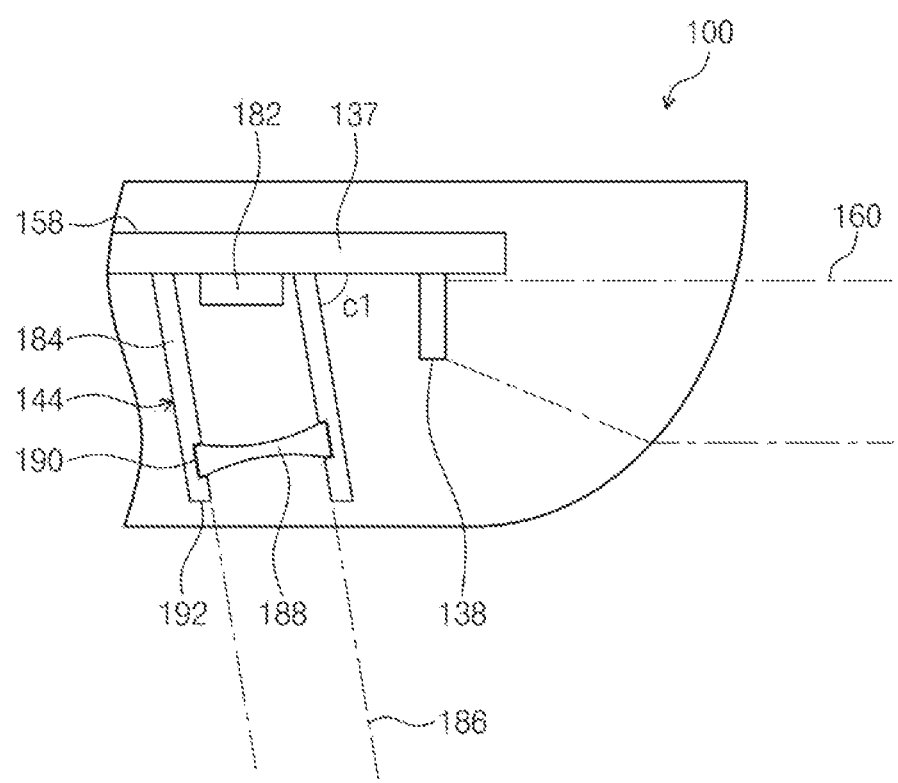
FIG. 9 is a cross-sectional top view of the stop lamp and cargo lamp system in FIG. 6, illustrating a third cargo lamp assembly of the stop lamp and cargo lamp system.

FIG. 9 is a cross-sectional view of the stop lamp and cargo lamp system 100 in FIG. 6, schematically illustrating the third cargo lamp assembly 144 and associated components. The third cargo lamp assembly 144 may include a third cargo lamp 182 and a third directional tube 184. The third cargo lamp 182 may include a LED. The third directional tube 184 may form a downward angle "c1" with a surface of the circuit board 137. The downward angle "c1" may be different from the downward angle "a1" of the first directional tube 156, and the downward angle "b1" of the second directional tube 172. In this manner, the light from the third cargo lamp assembly 144 may be directed downward to a different degree than the light from the first cargo lamp assembly 40 and the second cargo lamp assembly 142. Referring back to FIG. 6, in some embodiments, the third directional tube 84 may form a lateral angle "c2" with a line at a length direction L of the stop lamp and cargo lamp system 100. The lateral angle "c2" may be different from the lateral angle "a2" of the first directional tube 56 and the lateral angle "b2" of the second directional tube 172. In this manner, the light from the third cargo lamp assembly 144 may be directed a different degree at the length direction I, than the light from the first cargo lamp assembly 140 and the second cargo lamp assembly 142. The light passing through the third cargo lamp assembly 144 may form a light path 186 that is different from the light path 162 generated by the first cargo lamp assembly 140 and the light path 174 generated by the second cargo lamp assembly 142. The light path 186 of the second cargo lamp assembly 144 may be rearward but further downward compared to the light path 160 of the stop lamp 138, the light path 162 of the first cargo lamp assembly 140 and the light path 174 of the second cargo lamp assembly 142.

In some embodiments, the third cargo lamp assembly 144 may further include a third lens 188. In some embodiments, the third lens 188 may be disposed to be spaced away from the third cargo lamp 182 and may be disposed on a recess 190 at a distal end 192 of the first directional tube 184.

Figure 10:
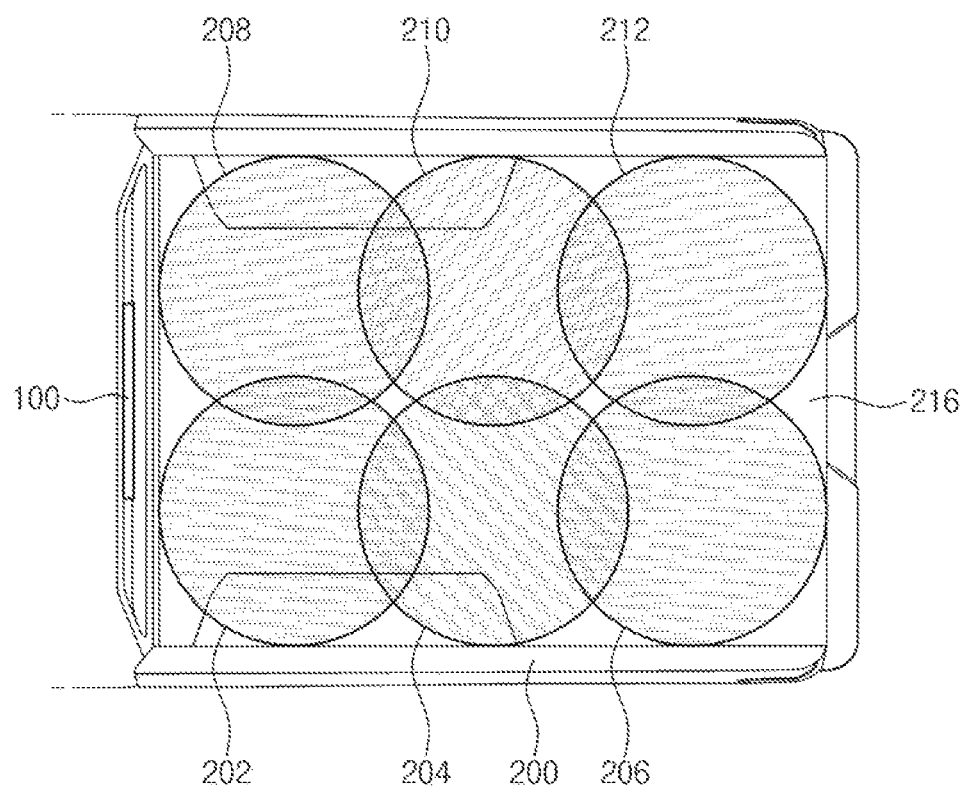
FIG. 10 is a plan view of a cargo bed of a truck, schematically illustrating light beam patterns of the stop lamp and cargo lamp system of FIG. 6.

Now referring to FIG. 6, in some embodiments, the fourth cargo lamp assembly 146 may be configured to have a symmetric structure to the third cargo lamp assembly 144 relative to a central line C of the housing 136 of the stop lamp and cargo lamp assembly 100. In some embodiments, a directional tube 147 of the fourth cargo lamp assembly 146 may have the same downward angle as that of the third cargo lamp assembly 144 and have a lateral angle having the same degree but slanted to an opposite direction as that of the third cargo lamp assembly 44. As a result, the fourth cargo lamp assembly 146 may project a beam pattern that is symmetric to a beam pattern projected from the third cargo lamp assembly 144 the central line C. Similarly, the fifth and sixth cargo lamp assembly 148 and 150 may be configured to have a symmetric structure to the second and first cargo lamp assemblies 142 and 140 relative to the central line C, respectively FIG. 10 is a plan view of a cargo bed 200 of a truck, schematically illustrating example light beam patterns of the stop lamp and cargo lamp system 100. In some embodiments, beam patterns 202, 204 and 206 may corresponding to the lights from the first, second and third cargo lamp assembly 140, 142 and 144, and beam patterns 208, 210 and 212 may corresponding to the lights from the fourth, fifth and six cargo lamp assembly 146, 148 and 150. In the depicted embodiment, the beam pattern from each cargo lamp assembly has substantially the same size. The beam patterns 202, 204, 206, 208, 210 and 212 collectively may substantially cover a main area 216 of the cargo bed 200.

It should be appreciated that a stop lamp and cargo lamp assembly may have various configurations and include any suitable number of the cargo lamp assemblies. For example, a stop lamp and cargo lamp system may include a housing, circuit board, a plurality of stop lamps, a first, second, a third and a fourth cargo lamp assemblies to project four beam patterns on the cargo bed. The first, second, third, and fourth cargo lamp assemblies may be disposed along a length of the housing sequentially. The first cargo lamp assembly may include a first cargo lamp mounted on the circuit board and a first directional tube coupled to the first cargo lamp and formed to a first angle with a surface of the circuit board. The second cargo lamp assembly may include a second cargo lamp mounted on the circuit board and a second directional tube coupled to the second cargo lamp and formed to a second angle with the surface of the circuit board. The third cargo lamp assembly may include a third cargo lamp mounted on the circuit board and a third directional tube coupled to the third cargo lamp and formed to a third angle with the surface of the circuit board. The fourth cargo lamp assembly may include a fourth cargo lamp mounted on the circuit board and a fourth directional tube coupled to the fourth cargo lamp and formed a fourth angle with the surface of the circuit board. In some embodiments, the first, second, third and fourth angles may be different. In some embodiments, the configuration of the first and second directional tubes may be symmetric to that of the third and fourth directional tubes relative to a center of the housing. In another example, the stop lamp and cargo lamp system may include two cargo lamp assemblies to project two beam patterns in the cargo bed.

It further should be appreciated that the cargo lamp assemblies may be disposed along a height direction of a housing or the vehicle. For example, one cargo lamp assembly may be disposed above another cargo lamp assembly in the vehicle's height direction. Further, the beam patterns may have the substantially the same size or have different sizes via selection of the lens.

The stop lamp and cargo lamp systems of the present disclosure have various advantageous. For example, the lights from the cargo lamps have different light paths so that the light can be directed to targeted areas of a cargo bed or the light beams substantially cover a main area of the cargo bed, which provides desired illumination needed by a user. At the same time, the lights are directed downward to avoid interference with a line of sight of an approaching vehicle from the rear. In this way, the homologation requirement on the rear light can be met.

It will be appreciated that the configurations and routines disclosed herein are exemplary in nature, and that these specific embodiments are not to be considered in a limiting sense, because numerous variations are possible.

The following claims particularly point out certain combinations and subcombinations regarded as novel and non-obvious. These claims may refer to element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

The invention claimed is:

1. A stop lamp and cargo lamp system, comprising:
a circuit board;
a stop lamp mounted on the circuit board;
a first cargo lamp assembly including a first cargo lamp mounted on the circuit board and a first directional tube coupled to the first cargo lamp, wherein the first directional tube forms a first downward angle with a surface of the circuit board; and
a second cargo lamp assembly including a second cargo lamp mounted on the circuit board and a second directional tube coupled to the second cargo lamp, wherein the second directional tube forms a second downward angle with the surface of the circuit board, wherein the second downward angle is different from the first downward angle.

2. The stop lamp and cargo lamp system of claim 1, wherein the first cargo lamp assembly further includes a first lens disposed on the first directional tube, and the second cargo lamp assembly further includes a second lens disposed on the second directional tube.

3. The stop lamp and cargo lamp system of claim 1, wherein the stop lamp is mounted on the surface of the circuit board or the stop lamp is mounted on a surface opposite to the surface the first cargo lamp and the second cargo lamp is mounted.

4. The stop lamp and cargo lamp system of claim 3, wherein the first directional tube is configured to direct light from the first cargo lamp downward to form a first light path, and the second directional tube is configured to direct light downward to form a second light path different from the first light path; and wherein light from the stop lamp forms a third light path different from the first light path and the second light path.

5. The stop lamp and cargo lamp system of claim 3, further comprising a housing enclosing the circuit board, the stop lamp, the first and second cargo lamp assemblies, wherein the surface of the circuit board faces rearward and is substantially perpendicular to a top surface of the housing.

6. The stop lamp and cargo lamp system of claim 3, further comprising a housing enclosing the circuit board, the stop lamp, the first and second cargo lamp assemblies, wherein the surface of the circuit board faces downward and is substantially parallel to a top surface of the housing.

7. The stop lamp and cargo lamp system of claim 1, wherein the first cargo lamp, the second cargo lamp and the stop lamp are LEDs.

8. The stop lamp and cargo lamp system of claim 1, wherein the light from the first cargo lamp assembly and the second cargo lamp assembly are projected more downward than light from the stop lamp such that the lights from the first and second cargo lamps do not interfere with line of sight of approaching vehicle from rear.

9. The stop lamp and cargo lamp system of claim 1, wherein the first directional tube and second direction tube are formed from a tube having the same diameter or formed from a tube having varied diameters.

10. The stop lamp and cargo lamp system of claim 1, wherein the first directional tube and the second directional tube are made from material that is opaque to light and the first directional tube is coupled to the first cargo lamp by attaching a base end of the first directional tube to the circuit board and the second directional tube is coupled to the second cargo lamp by attaching a base end of the second directional tube to the circuit board.

11. The stop lamp and cargo lamp system of claim 1, wherein the first cargo lamp and the second cargo lamp are turned on or off by a user via a switch or the first cargo lamp and the second cargo lamp are connected to an interior light system, and the first cargo lamp and the second cargo lamp is turned on when an interior light is on.

12. The stop lamp and cargo lamp system of claim 1, wherein the first directional tube and the second direction tube are snapped to the first cargo lamp and the second cargo lamp, respectively.

13. The stop lamp and cargo lamp system of claim 1, further comprising a housing and a third cargo lamp assembly, wherein the first, second and third cargo lamp assemblies are disposed along a length of the housing sequentially, wherein the third cargo lamp assembly includes a third cargo lamp mounted on the surface of the circuit board and a third directional tube coupled to the third cargo lamp and formed a third downward angle that is substantially the same as the first downward angle.

14. The stop lamp and cargo lamp system of claim 1, further comprising a housing, a third cargo lamp assembly, a fourth cargo lamp assembly, a fifth cargo lamp assembly, and a sixth cargo lamp assembly, wherein the first, second, third, fourth, fifth, and sixth cargo lamp assemblies are disposed along a length of the housing sequentially, wherein the third cargo lamp assembly includes a third cargo lamp mounted on the circuit board and a third directional tube coupled to the third cargo lamp to form to a third downward angle that is different from the first downward angle and the second downward angle; wherein the fourth cargo lamp assembly includes a fourth cargo lamp mounted on the circuit board and a fourth directional tube coupled to the fourth cargo lamp to form a fourth downward angle that is substantially the same as the third downward angle, wherein the fifth cargo lamp assembly includes a fifth cargo lamp mounted on the circuit board and a fifth directional tube coupled to the fifth cargo lamp to a fifth downward angle that is substantially the same as the second downward angle, wherein the sixth cargo lamp assembly includes a sixth cargo lamp mounted on the circuit board and a sixth directional tube coupled to the sixth cargo lamp to form a sixth downward angle that is substantially the same as the first downward angle.

15. A stop lamp and cargo lamp system in a vehicle, comprising:
a circuit board;
a plurality of stop lamps on the circuit board;
a first cargo lamp mounted on the circuit board and a first directional tube coupled to the first cargo lamp and configured to direct light from the first cargo lamp downward and rearward to a first cargo area of the vehicle;
a second cargo lamp mounted on the circuit board and a second directional tube coupled to the second cargo lamp and is configured to direct light from the second cargo lamp downward and rearward to a second cargo area of the vehicle,
wherein the first cargo area is different from the second cargo area.

16. The stop lamp and cargo lamp system of claim 15, further comprising a first lens disposed in the first directional tube and a second lens disposed in the second directional tube, wherein the first lens is disposed to be spaced away from the first cargo lamp and mounted on a recess at a distal end of the first directional tube, and wherein the second lens is disposed to be spaced away from the second cargo lamp and mounted on a recess at a distal end of the second directional tube.

17. The stop lamp and cargo lamp system of claim 15, wherein the lights from the first cargo lamp and the second cargo lamp are directed downward so as not to interfere with line of sight of approaching vehicle from rear.

18. A truck, comprising:
   a cab;
   a cargo bed; and
   a stop lamp and cargo lamp system including:
      a housing mounted on an exterior top area of the cab,
      a circuit board disposed in the housing,
      a stop lamp mounted on the circuit board, and
      a plurality of cargo lamp assemblies, wherein each of the cargo lamp assemblies is configured to direct a light to a predetermined cargo area in the cargo bed,
      wherein light beams from the plurality of cargo lamp assembly collectively cover a main area of a cargo bed of the truck, and wherein each cargo lamp assembly includes a directional tube to direct the light to the predetermined area.

19. The truck of claim 18, wherein each cargo lamp assembly further includes a lens, and wherein the light from each cargo lamp is directed downward so that it does not interfere with line of sight of an approaching vehicle from a rear.

\* \* \* \* \*